(12) United States Patent
Piehler

(10) Patent No.: US 9,369,205 B2
(45) Date of Patent: Jun. 14, 2016

(54) PLUGGABLE OPTICAL TRANSMITTER MODULE FOR NETWORK OPTICAL TRANSPORT SYSTEM WITH DISTORTION CONTROL

(71) Applicant: NeoPhotonics Corporation, San Jose, CA (US)

(72) Inventor: David Piehler, Half Moon Bay, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 14/482,523

(22) Filed: Sep. 10, 2014

(65) Prior Publication Data

US 2014/0376927 A1   Dec. 25, 2014

Related U.S. Application Data

(63) Continuation of application No. 13/108,537, filed on May 16, 2011, now Pat. No. 8,867,928.

(60) Provisional application No. 61/345,199, filed on May 17, 2010.

(51) Int. Cl.
*H04B 10/2575* (2013.01)
*H04B 10/588* (2013.01)
(Continued)

(52) U.S. Cl.
CPC ...... *H04B 10/25751* (2013.01); *H04B 10/2507* (2013.01); *H04B 10/58* (2013.01); *H04B 10/588* (2013.01)

(58) Field of Classification Search
CPC ........... H04B 10/2507; H04B 10/2513; H04B 10/2531–10/2572; H04B 10/25759; H04B 10/5057–10/50597
See application file for complete search history.

(56) References Cited

U.S. PATENT DOCUMENTS

| | | |
|---|---|---|
| 5,161,044 A | 11/1992 | Nazarathy et al. |
| 5,321,710 A * | 6/1994 | Cornish et al. ................ 372/26 |

(Continued)

FOREIGN PATENT DOCUMENTS

EP   1 746 746 A1   1/2007

OTHER PUBLICATIONS

Bonen et al., "The Road to Personalized Video is Paved with HectoQAMs", 1-19.

(Continued)

*Primary Examiner* — David Payne
*Assistant Examiner* — Casey Kretzer
(74) *Attorney, Agent, or Firm* — Dardi & Herbert, PLLC; Peter S. Dardi

(57) ABSTRACT

Linearized optical transmitter units are described for a hybrid optical fiber coaxial cable network. The linearized optical transmitter unit can comprise a directly-modulated or externally-modulated laser optically coupled to an optical conduit directed to an optical fiber communications link and electrically coupled to an electrical RF source line that provides an RF source to drive the laser or an external modulator for a light beam from the laser. A linearization information electrical component comprising memory and/or a processor, and a data output configured to transmit linearization enabling data for input into a direct digital synthesis engine that enables the direct digital synthesis engine to generate an RF signal wherein nonlinear responses of the transmitter and/or the optical fiber communications link are pre-compensated, in which the data is specific for the optical transmitter and/or the optical fiber communications link. An electronic communication channel can connected to the data output of the electrical component to communicate the linearization enabling data external to the linearized optical transmitter unit suitable for communication to the direct digital synthesis engine. The linearized optical transmitter can be assembled in a plug-in module. Corresponding HFC systems and methods are also described.

19 Claims, 7 Drawing Sheets

(51) Int. Cl.
*H04B 10/2507* (2013.01)
*H04B 10/58* (2013.01)

(56) References Cited

U.S. PATENT DOCUMENTS

| | | | |
|---|---|---|---|
| 5,424,680 | A | 6/1995 | Nazarathy et al. |
| 5,751,872 | A | 5/1998 | Bissessur et al. |
| 6,137,939 | A | 10/2000 | Henry et al. |
| 6,255,908 | B1 | 7/2001 | Ghannouchi et al. |
| 7,068,730 | B2 | 6/2006 | Monta |
| 7,426,350 | B1 | 9/2008 | Sun et al. |
| 7,916,385 | B2 | 3/2011 | Piehler et al. |
| 8,145,066 | B2 | 3/2012 | Painchaud et al. |
| 2005/0141895 | A1* | 6/2005 | Ruiz ............................ 398/115 |
| 2005/0213992 | A1 | 9/2005 | Piehler |
| 2005/0271396 | A1 | 12/2005 | Iannelli |
| 2006/0078336 | A1 | 4/2006 | McNicol et al. |
| 2007/0031104 | A1 | 2/2007 | Chen et al. |
| 2007/0237194 | A1* | 10/2007 | Shahine ................. 372/29.011 |
| 2008/0080862 | A1 | 4/2008 | Shen et al. |
| 2008/0101801 | A1 | 5/2008 | Khalouf et al. |
| 2008/0138071 | A1 | 6/2008 | Lee et al. |
| 2008/0159435 | A1* | 7/2008 | Cohen ........................... 375/297 |
| 2009/0041474 | A1 | 2/2009 | Ishaug |
| 2009/0041475 | A1* | 2/2009 | Kazemi-Nia et al. ......... 398/198 |
| 2009/0214221 | A1* | 8/2009 | Li et al. ......................... 398/136 |
| 2009/0237767 | A1 | 9/2009 | Painchaud et al. |
| 2009/0297168 | A1* | 12/2009 | Miyata et al. ................. 398/198 |
| 2010/0014868 | A1* | 1/2010 | McGlynn et al. ............. 398/115 |
| 2010/0158538 | A1* | 6/2010 | Mazzini et al. ............... 398/182 |
| 2012/0183289 | A1 | 7/2012 | Lou et al. |

OTHER PUBLICATIONS

Cvijetic, "OFDM in Optical Access Networks," in Optical Fiber Communication Conference, Los Angeles, CA (2011).

Cvijetic, "OFDM in Optical Access Networks," J. Lightwave Technology, 30(4):384-398 (2012).

Gysel et al., "Electrical predistortion to compensate for combined effect of laser chirp and fiber dispersion," Electron. Lett. 27, 271 (1991).

Kuo, "Fundamental second order nonlinear distortions in analog AM CATV transport systems based on single frequency semiconductor lasers," J. Lightwave Tech., 10(2):235-243 (1992).

Piehler, "Migrating the HFC Plant to a High-Reliability All-Digital Network," Technical Digest, SCTE 2004 Conference on Emerging Technologies, Society of Cable Telecommunication Engineers, (2004).

Wilson et al., "Predistortion of electroabsorption modulators for analog CATV systems at 155 μm," J. Lightwave Tech., 15(9): 1654-1662, (1997).

NeoPhotonics | Innovation Through Integration, http://www.neophotonics.com/products/productss.aspx?typeid=18, accessed Jun. 9, 2015.

Taiwan Search Report from Taiwan application No. 100117252 dated Aug. 25, 2015 (1 page).

* cited by examiner

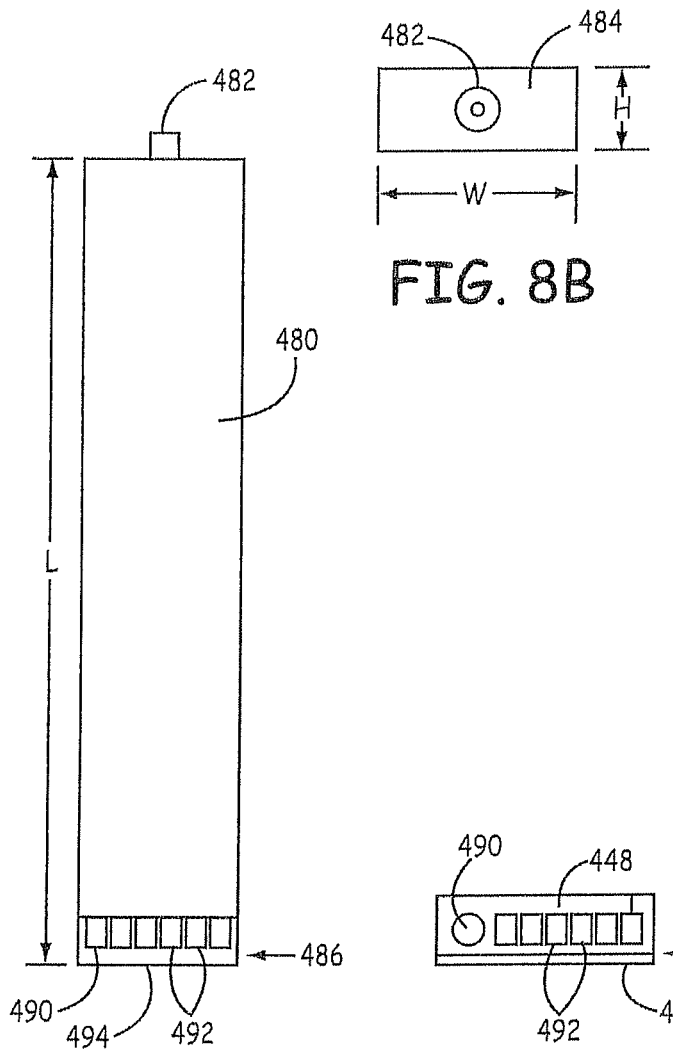

PLUGGABLE OPTICAL TRANSMITTER MODULE FOR NETWORK OPTICAL TRANSPORT SYSTEM WITH DISTORTION CONTROL

CROSS REFERENCE TO RELATED APPLICATIONS

This application is a continuation of copending U.S. patent application Ser. No. 13/108,537 filed on May 16, 2011 to Piehler, entitled "Hybrid Fiber Coaxial Network Optical Transport System with Distortion Control," which claims priority to copending U.S. provisional patent application Ser. No. 61/345,199 filed on May 17, 2010 to Piehler, entitled "HFC Optical Transport System," both of which incorporated herein by reference.

FIELD OF THE INVENTION

The invention relates to optical transmitter units for incorporation into a hybrid fiber coaxial network to provide for efficient pre-distortion of the light output. The invention further relates to methods for the implementation of efficient pre-distortion as well as modules, such as plug-in modules, for optical transmitter units.

BACKGROUND OF THE INVENTION

Many cable television (CATV) systems generally transmit radio frequency electrical signals over a hybrid network with optical fiber communication channels interfaced with coaxial electrical cables. A plurality of user signals is simultaneously transported over long ranges over different portions of an RF spectral band. Each user signal can include analog video signals, broadcast digital video, video on demand and digital signals, which enable access through an internet gateway. To aggregate and format the plurality of signals for transmission over the (HFC) network, at least some of the signals are modulated into RF subcarriers using direct digital synthesis, and the RF signal is subsequently used to drive an optical transmitter to form the optical signal that is then transported along a fiber network.

A modulator converts a baseband digital signal input into a radio frequency signal. The radio frequency signal is used to modulate a laser to transmit the optical signal along the optical fiber network. The laser may be either directly- or externally-modulated. The laser is part of a component of the system that can be referred to as the optical transmitter. The modulators for converting the input baseband digital signals into a plurality of RF subcarrier signals each with QAM (quadrature amplitude modulation) for driving the optical transmitter are referred to in the art as edge-QAM devices. If the optical transmitter is appropriately packaged, the operator can replace the unit conveniently if the optical transmitter is damaged or if there is another desired change. While there is continuing demand for greater bandwidth available to individual users, there is also corresponding pressure to keep a low cost structure.

SUMMARY OF THE INVENTION

In a first aspect, the invention pertains to a linearized optical transmitter unit for a hybrid optical fiber coaxial cable network, in which the linearized optical transmitter unit comprises a directly-modulated or externally-modulated laser, a linearization information electrical component, and a communication channel. The laser is optically coupled to an optical conduit directed to an optical fiber communications link and electrically coupled to an electrical RF source line that provides an RF source to drive the laser or an external modulator for a light beam from the laser. The linearization information electrical component can comprise memory and/or a processor, and a data output configured to transmit linearization enabling data for input into a direct digital synthesis engine that enables the direct digital synthesis engine to generate an RF signal wherein nonlinear responses of the transmitter and/or the optical fiber communications link are pre-compensated, wherein the data is specific for the optical transmitter and/or the optical fiber communications link. An electronic communication channel can be connected to the data output of the electrical component to communicate the linearization enabling data external to the linearized optical transmitter unit suitable for communication to the direct digital synthesis engine In some embodiments, the optical transmitter is incorporated into a pluggable optical transmitter module. The module comprises a housing with the optical transmitter unit within the housing. An electrical plug connection can provide an interface through the housing, in which the connection comprises an RF signal input connection and a plurality of pin connectors wherein the RF signal input is in electrical connection with the laser or the modulator and at least some of the pins are in electrical connection with the communications channel. An optical connector provides an interface through the housing and designed for interfacing with an optical fiber or an optical fiber connector.

Furthermore, the invention pertains to a hybrid fiber coaxial transmission system comprising one or more digital sources, a digital switch operably connected to the digital sources, one or more direct digital synthesis engines operably connected to the digital switch, an RF output channel and a linearized optical transmitter unit operably connected to the RF output channel. In general, the communications channel of the linearized optical transmitter unit is operably connected to the direct digital synthesis engine.

In further aspects, the invention pertains to a method for performing pre-distortion to provide a desired signal fidelity from an optical transmitter providing a RF optical interface, the method comprising the step of incorporating pre-distortion parameters into a direct digital synthesis component of an RF modulator for the simultaneous generation of an RF signal incorporating digital content along with the pre-distorted RF signal. In general, at least some of the pre-distortion parameters are derived from information from an optical transmitter unit comprising a directly-modulated or externally-modulated laser and unit specific information.

In additional aspects, the invention pertains to a pluggable optical transmitter module for providing an optical interface within a hybrid fiber-coaxial cable system comprising:

a directly-modulated or externally-modulated laser optically coupled to an optical conduit directed to an optical fiber communications link and electrically coupled to an electrical RF source line that provides an RF source to drive the optical transmitter;

an electrical storage/processing component comprising a data output configured to transmit linearization data for input into a direct digital synthesis engine to enable the direct digital synthesis engine to generate an RF signal wherein nonlinear responses of the transmitter and/or the optical fiber communications link are pre-compensated, wherein the data is specific for the optical transmitter and/or the optical fiber communications link;

a communication channel connected to the data output of the electrical storage/processing component to carry the linearization data specific for the optical transmitter and/or the optical fiber communications link;

a housing containing the laser and electrical storage/processing component;

an electrical plug connection providing an interface through the housing, the connection comprising an RF signal input connection and a plurality of pin connectors wherein the RF signal input is in electrical connection with the laser or an external modulator for the laser beam and at least some of the pins are in electrical connection with the communications channel; and an optical connector providing an interface through the housing and designed for interfacing with an optical fiber or an optical fiber connector.

BRIEF DESCRIPTION OF THE DRAWINGS

FIG. 8A is a top view of a pluggable package for an optical transmission module with functionality for providing pre-distortion information;

FIG. 8B is a front view of the module of FIG. 8A; and

FIG. 8C is a rear view of the module of FIG. 8A.

DETAILED DESCRIPTION OF THE INVENTION

Figure 1:
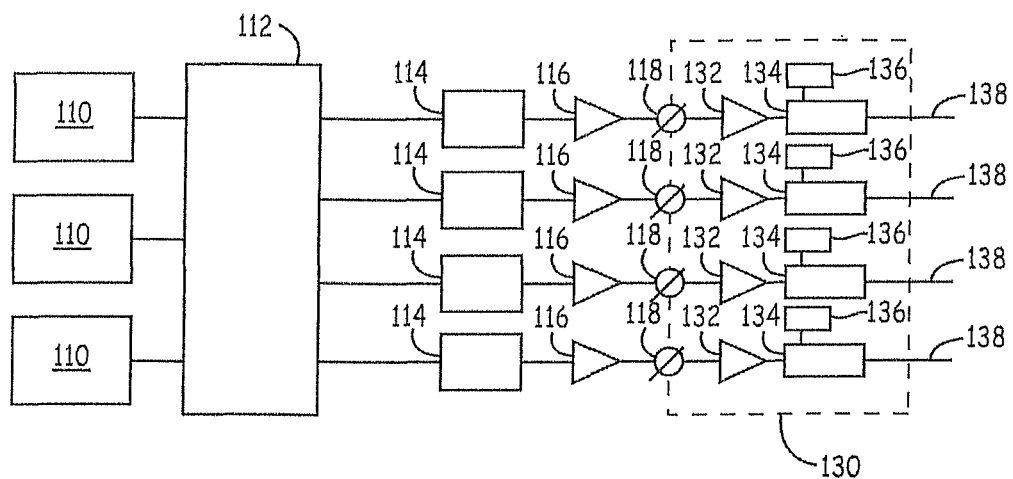
FIG. 1 is a schematic diagram of a hybrid fiber coaxial (HFC) system depicting a plurality of RF modulators interfaced with a corresponding plurality of optical transmitters.

Improved design of an interface between a radiofrequency modulator, e.g., an edge QAM, and an optical transmitter unit provides for efficient and versatile pre-compensation for non-linearities of the optical transmitter and/or optical path within a hybrid optical fiber coaxial cable system, i.e., HFC system. An optical transmitter produces varying levels of optical output power responsive to varying electrical levels (generally voltage, but could also be expressed as current or power) at its signal input. The relationship between voltage input and optical power output of a transmitter is not ideal, i.e., not linear, and varies among individual transmitters, but is can be precisely characterized and/or monitored as a function of basic operating conditions, such as temperature and operating frequency domain. In particular, the optical transmitter unit can comprise a directly or externally-modulated laser and an electrical component that provides specific pre-distortion information for the particular optical transmitter unit with a suitable output that can provide the pre-distortion parameters to the RF modulator. The pre-distortion information can be directed to a direct digital synthesis component of the RF modulator for the efficient incorporation of the pre-distortion signal into the RF domain simultaneously with the corresponding conversion of digital signals into the RF domain. With this design, a desirable optical transmitter can be used incorporating a less expensive laser and a smaller format with appropriate pre-distortion adapted for the particular optical transmitter unit that provides for output of a high quality signal from the optical transmitter into the optical transmission system directed to the ultimate users. Thus, in some embodiments, the optical transmitter can be conveniently assembled as a pluggable unit with a small foot print, low power consumption and a relatively low cost.

A time varying signal that is used to generate the light beam modulation can broadly include usable information broadly across the frequency domain. Generally, the frequency domain of interest is from about 3 kilohertz (kHz) to about 300 GigaHertz (GHz), although in principle usable signals can be transmitted in the time domain outside of this broad range of frequencies. As used herein, RF or radiofrequency is intended to encompass any useable frequencies for information transmission in the time domain, including but not limited to the traditional radiofrequency range from about 3 kHz to about 300 GHz. HFC networks are a subset of a more general category of networks known as orthogonal frequency division multiplexing-passive optical networks (OFDM-PON), and the improved systems described herein are equally applicable across OFDM-PON generally. In particular, the frequencies can be different from the 50-1002 MHz commonly used for HFC, and the RF modulator may not be called an edge-QAM, although it is noted herein that edge-QAM is to be interpretted broadly and interchangeably with RF modulator. More generally, the digital modulation format does not need to follow the 256-QAM format. Similarly, the number of RF sub-carriers and channel bandwidth may differ from the 160, 6-MHz NTSC standard for HFC. An intensity-modulated, direct-detection (IM-DD) OFDM-PON is described in Cvijetic, "OFDM in Optical Access Networks," in *Optical Fiber Communications Conference*, OSA Technical Digest (CD) (Optical Society of America, 2011), paper OMG3, incorporated herein by reference. An IM-DD OFDM-PON signal modulator generates a multichannel RF signal via a process of direct digital synthesis and requires an end-of-line signal with very low noise and intermodulation distortion.

Hybrid fiber coaxial (HFC) systems use a directly modulated optical transmitter module connected to a radio frequency modulation signal to generate an optical signal that is then transmitted to a suitable receiver at a node serving one or more users. In optical communications, including, for example, HFC systems, the directly modulated lasers modules generally can be distributed feedback (DFB) lasers. In some embodiments, a C-band (1535 nm-1365 nm) laser can be used, and in other embodiments an O-band (1260 nm-1360 nm) DFB laser can be used. The O-band lasers result in low levels of fiber-induced intermodulation distortion since chromatic dispersion of standard-single mode fibers is low in this wavelength range. However, the nonlinear response of a DFB laser depends on operating conditions, such as temperature and/or the laser bias current. Further nonlinearities can result from the connection of the optical transmitter to a length of optical fiber. Equivalent optical transmitter modules can be formed using an externally modulated laser, which comprise a separate modulator to modulate a light beam and a laser, such as a DFB laser. The modulator can be, for example, Mach-Zehnder modulator, such as a lithium niobate-based modulator, or other electro-absorption modulators. Linearization of externally modulated laser signals modulated with an InP-based modulator driven with analog RF signal with pre-distortion, is described by Wilson et al, "Predistortion of electroabsorption modulators for analog CATV systems at 1.55 μm," J. Lightwave Tech. 15, 1654-1662 (1997). While the discussion herein focuses more on directly-modulated lasers, the linearization approach generally is similarly applicable to optical transmitter units with externally modulated lasers.

Thus, to compensate for the non-linear responses of the optical transmitter, the modulated driving signal to the laser can be modified or pre-distorted to approximately compensate for the distortion of the optical transmitter (and the length of fiber, if necessary) such that the end-of-line signal from the laser more approximately corresponds to the communication signal with minimal added noise or distortion. The reduction of intermodulation distortion in the communications signal can be significant for the transmission of high resolution digital video signals as well as for other components of the communication signal. A further discussion of integration concepts in HFC systems is found in Piehler, "Migrating the HFC Plant to a High-Reliability All-Digital Network," Technical Digest, SCTE 2004 Conference on Emerging Technologies, Society of Cable Telecommunication Engineers, 2004, incorporated herein by reference.

In general, a suitable optical link can have several sources of nonlinearities. As used herein, optical link refers to a combination of optical transmitter, a length of optical fiber, which may include optical amplifiers, or passive components, and an optical receiver. In addition to intrinsic nonlinearities in the response of a DFB laser, interactions between the light transmission carrying the RF signal and elements of the optical path from the optical transmitter to the optical receiver can generate intermodulation distortion (IMD), negatively affecting the RF signal. One source of IMD results from the interaction between laser chirp and fiber chromatic dispersion, which generates a net IMD depending on the net chromatic dispersion in a link and on the overall fiber length between transmitter and receiver. Another source of IMD results from an interaction between laser chirp and wavelength-dependent gain or loss. As an example of wavelength-dependent gain, some erbium-doped fiber amplifiers exhibit gain tilt. Furthermore, the interaction between self-phase modulation and chromatic dispersion generates an IMD that depends on the fiber's chromatic dispersion, the fiber path between transmitter and receiver, the optical power directed into the fiber and the fiber attenuation.

The nature of IMD effects is well documented such that the pre-distortion circuits can be adjusted to compensate for fiber-link induced distortions. Many of the fiber induced IMDs are dependent on overall fiber length, and compensation for overall distortion (intrinsic optical transmitter+fiber-induced) can be accounted for if the location of the optical receiver is located at a particular fiber-distance from the transmitter within some amount of tolerance. For example, the second order IMD due to the interaction of the laser chirp (dv/dI) and fiber chromatic dispersion, D, can be estimated as proportional to D L (dv/dI) j ω, where L is the fiber length, ω/2π is the RF frequency and j is the square root of −1, when the RF frequency is well below the laser relaxation oscillation frequency. The general concept of utilizing pre-distortions in the electrical domain to account for distortion produced in the optical domain are described in U.S. Pat. No. 5,424,680 to Nazarathy et al., entitled "Predistorter for High Frequency Optical Telecommunication Devices," and U.S. Pat. No. 5,161,044 to Nazarathy et al., entitled "Optical Transmitters Linearized by Means of Parametric Feedback," both of which are incorporated herein by reference. Specific extra pre-distortions for the end-to-end optical link are described further in Gysel et al., "Electrical predistortion to compensate for combined effect of laser chirp and fiber dispersion," Electron. Lett. 27, 271 (1991) and Kuo, "Fundamental second order nonlinear distortions in analog AM CATV transport systems based on single frequency semiconductor lasers," J. Lightwave Technol. 10, 235-243 (1992), both of which are incorporated herein by reference.

While the optical transmitter of the HFC system should produce a signal with low noise and low intermodulation distortion for delivery to the user, it is desirable to have a low cost unit, but, for example, low cost DFB lasers can also have greater nonlinearity. Specially manufactured and tested DFB lasers can be used to introduce more linear response, and linearized optical transmitters can maintain this constant, relatively low nonlinearity by controlling the laser temperature and bias current to constant values. A specially constructed analog RF linearizer or pre-distorter can compensate for this relatively low laser nonlinearity while increasing the cost of the optical transmitter unit significantly. Accommodation of lower cost optical components can be used to provide desired low noise and low intermodulation distortion signals if the edge-QAM provides appropriate the compensation for nonlinearities, such as the laser's second and third order intermodulation distortion as well as nonlinearities induced by the optical fiber and other optical components external to the optical transmitter. The systems described herein provide a low cost, small format and low power consumption approach to the generation of an optical signal corrected for nonlinearities of the optical transmitter, and when necessary, the optical link. A significant aspect of the new design is based on the integration of the optical transmitter with a state of the art design of the RF modulator.

Digital RF modulators for HFC systems are generally known in the art as edge-QAM modulators, where QAM stands for quadrature amplitude modulation. For convenience, the RF modulator is referred to interchangeably herein as an edge-QAM, but this terminology is not intended to imply any specific structure or modulation format that is not explicitly described herein. The edge-QAM can comprise a direct digital synthesis (DDS) engine that can comprise a suitable processor, such as a field programmable gate array (FPGA) or an application specific integrated circuit (ASIC), which processes the various components of digital signals that are then delivered to a high speed digital-to-analog (DAC) converter that generates the corresponding RF driving signal for the optical transmitter.

An edge-QAM can be used to convert data from base-band digital format into a format appropriate for delivery over a coaxial RF cable. The on/off keyed (OOK) base-band data is transported to the edge-QAM via an Ethernet format, 10-gigabit-per-second Ethernet (10 GbE) or gigabit-per-second Ethernet (GbE), for example. Within the edge-QAM the high-bandwidth (or data-rate) input data stream ($DS_0$) is segmented into one or more lower-bandwidth (say 40 Mb/s) data streams ($DS_1$, $DS_2$ ... $DS_N$). Within the edge-QAM each of the lower-bandwidth data streams are converted from a stream of ones and zeros into a constellation of 256 distinct symbols in a known process known as quadrature amplitude modulation (QAM). The RF power spectral density of the 256-QAM constellation will be centered at some intermediate frequency (IF), with a bandwidth of about 6 MHz. A typical IF is 20 MHz. RF upconversion is a process that transforms a signal centered at $f_{IF}$ to an identical signal centered at frequency $f_{UC}$. A frequency agile RF upconverter within the edge-QAM can be used to convert the 256-QAM signal to at a frequency corresponding to a cable TV channel. (For example, under the NTSC standard, cable TV channel 78 is centered at 547.25 MHz).

Current edge-QAM products can modulate multiple (typically 8 or less) 6-MHz wide, 40-Mb/s 256-QAM streams onto user-selectable RF channels. By using a set of current edge-QAM products, one can generate enough 256-QAM modulated channels to cover the entire usable cable TV spectrum (50-1002 MHz). This can be achieved by using a passive RF combiner to aggregate the RF output of a multiplicity of edge-QAMs onto a single RF cable. Further advances in this capability can be expected. When a currently available very fast, and very linear analog-to-digital converter is coupled to a sufficiently powerful ASIC or FPGA, a 6.4 Gb/s data stream can be simultaneously converted into 160 distinct 40 Mb/s data streams, with each stream modulating a 6-MHz 256-QAM constellation of symbols, onto 160 distinct RF frequencies (channels) spanning the entire cable-TV spectrum (50-1002 MHz). Note that a portion of the RF spectrum can originate form a legacy RF source without distracting from the desired improvements described herein, and the legacy signals can be combined with the optical transmitter in the optical domain.

The availability of suitable high-speed DACs provides for an efficient design of the DDS engine, and the transmitter designs herein make further use of the efficient DDS design by using the DDS to also generate a specified pre-distortion signal for correcting for the nonlinearities of the optical transmitter unit and the fiber link. Thus, the optical transmitter provides pre-distortion parameters to the DDS such that the digital signal to the high-speed DAC generates a RF signal accounting for the pre-distortion to correct the optical transmitter output. The pre-distortion information from the optical transmitter can be directly delivered to the DDS or it can be processed by additional components of the RF modulator before the information is delivered to the DDS. In any case, the pre-distortion can be implemented by the DDS in either the frequency domain or the time domain depending on how the edge QAM processes the digital synthesis. Fourier transform methods can convert the functions acting on the RF signal in the frequency domain into functions acting on the signal in the time domain. In other words, the pre-distortion information can an approximation, e.g., a step-by-step linear or nonlinear approximation, of the function in either the frequency or the time domains sufficiently approximating the nonlinearities for the output of the transmitter to meet the desired quality of the signal received by the user. In general, the pre-distortion can compensate for the net nonlinearity of the optical transmitter including, but not limited to, the laser or modulator driver, other optical components and other RF components, such as RF amplifiers.

In some embodiments, the optical transmitter unit comprises a set of pre-distortion parameters in a suitable memory, such as RAM memory, set upon initial testing of the optical transmitter unit according to a particular equation describing the non-linear response of the optical transmitter unit. The parameters can then be transmitted through an electrical connector to the edge-QAM where the parameters are delivered directly or indirectly after further processing to the DDS. In further embodiments, the optical transmitter comprises one or more sensors to dynamically update the parameters for more accurate implementation of the appropriate pre-distortion. In particular, suitable sensors include, for example, a temperature sensor (thermistor) and/or a laser bias sensor. Thus, the reported pre-distortion parameters can be updated based on the actual temperature of the laser and/or fluctuations in the laser bias voltage. In additional or alternative embodiments, the optical transmitter can further comprise an optical tap and photo-detector such that direct measurements of the optical signal distortion can be used to evaluate laser nonlinearities (and/or other end-of-line impacting parameters such as laser chirp) for direct evaluation of pre-distortion parameters for feedback to the DDS of the edge-QAM.

In some embodiments, the optical transmitter can be formed in a module, such as a pluggable module. Thus, one or more optical transmitter modules can be plugged into an edge-QAM such that the optical transmitters can be provided as convenient a relatively low cost, small format and low power consumption add on device. In general, a pluggable module would have a plug with an RF signal input and a plurality of pins for logical or electrical signal transmission between the edge-QAM and the optical transmitter module in which one, two or more pins can be used for transmitting pre-distortion parameters between the optical transmitter module and the edge-QAM. The RF signal input can be a blind mating coaxial cable connection. The plug and socket can have appropriate keyed design for a particular alignment of the plug and socket with shielding to protect the pins from damage.

Figure 2:
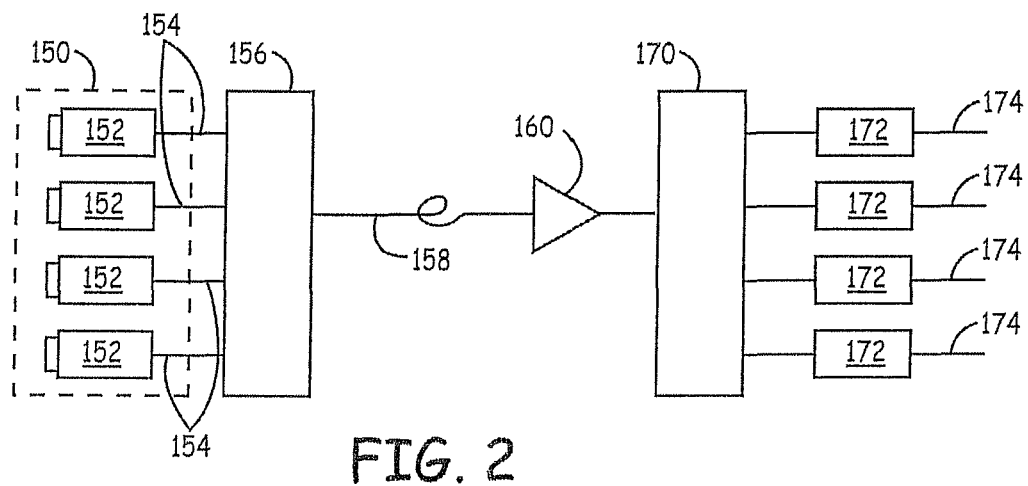
FIG. 2 is a schematic diagram showing the interface of a plurality of optical transmitters associated with a HFC system interfaced with an optical fiber transmission system to reach system users.

FIG. 1 shows the schematic interface of a cable termination system with a plurality of RF modulators interfacing with corresponding optical transmitters, and FIG. 2 shown the interface of the optical transmitters with an optical transport system. The optical transport system provides for efficient long range transport of relatively high bandwidth signals. Overall, the HFC optical transport system provides for an optical interface connecting input digital signals, such as video signals, internet communication and the like, generally provided with coaxial cables with a node connected to a user's location. Appropriate optical transmitters and receivers providing the interfaces between the optical transport system and the electronic transmissions at both ends of the system.

Referring to FIG. 1, signal sources 110 provide input into digital switch 112 (an Ethernet switch, for example). Suitable signal sources can include, for example, video broadcasts, pay-per-view video signals, video-on-demand, digital network connections, such as internet connections, and the like. Effectively, the combined sources can provide for a full time dedicated video, audio and data stream for each user. While FIG. 1 shows 3 signal sources, greater or fewer signal sources can be used as desired. Digital switch 112 appropriately combines input signals for directing the signals to direct digital synthesis units 114 that generate RF signals from the digital input. As noted, efficient direct digital synthesis (DDS) can be accomplished through the availability of high speed digital-to-analog converters (DAC) such that a plurality of signals can be systematically converted simultaneously to an RF signal that can be used to drive a laser to generate the optical signal. FIG. 1 shows 4 DDS units, but an actual system can comprise any number of DDS units connected to a single digital switch. Similar, a facility can comprise a desired number of digital switches to provide services for the appropriate number of users. An embodiment of wideband edge-QAM based on high speed digital processing and high speed DAC is described further in U.S. Pat. No. 7,068,730 to Monta, entitled "Wideband Multi-Channel Quadrature Amplitude Modulation of Cable Television Signals," incorporated herein by reference.

Referring to FIG. 1, DDS units 114 are generally connected to RF amplifiers 116. RF connectors 118 can be used to connect the edge-QAMs and related instrumentation with optical transmitter system 130. Optical transmitters associated with each RF line can comprise an RF amplifier 132, a laser driver/laser assembly 134 and appropriate control system 136. Laser driver/laser assemblies 134 are connected to corresponding fiber optic lines 138. As shown in FIG. 1, optical transmitter system 130 is drawn with a phantom line. While certain improvements described herein can be implemented in any reasonable configuration of optical transmitter system 130, in some embodiments, it can be desirable to partition optical transmitter a system 130 into modules, such as plug-in modules that comprise an electrical plug to plug into an edge-QAM. Thus, optical transmitter system 130 can be partitioned into a plurality of modules. A module can comprise one or more laser driver/laser assemblies, but a convenient configuration for inexpensive, versatile modules can have a single laser modulator and associated components.

FIG. 2 shows the interface of an optical transmitter 150 comprising a plurality of optical transmitter units or modules 152 connected by way of optical fibers or waveguides 154 to an optical multiplexer (MUX) 156. While it can be desirable to split the optical transmitter into separate units/modules, other architectures can be used for optical transmitter 150. Suitable optical multiplexers can include, for example, arrayed waveguide gratings (AWG), such as AWG planar optical chips (e.g., AWGs available from NeoPhotonic®), a set of thin film filters, or the like. Optical multiplexer 156 is generally connected then to an optical fiber transmission pathway 158, and fiber optic transmission pathway 158 can comprise suitable sections of optical fiber, one or more optical amplifiers 160, optical switches or other suitable optical transmission components. Generally, the optical fiber transmission pathway is connected to an optical de-multiplexer (DeMUX) 170 to split an optical signal into components for delivery to individual service groups, which can comprise a plurality of users. Again, an arrayed waveguide grating, such as a planar AWG, can be used to provide DeMUX functionality. The split optical signal can be delivered to optical receivers 172 that then generate an RF signal and/or other electrical signals for transmission along electrical lines 174, such as coaxial cables, for delivery to a user or users.

Figure 3A:
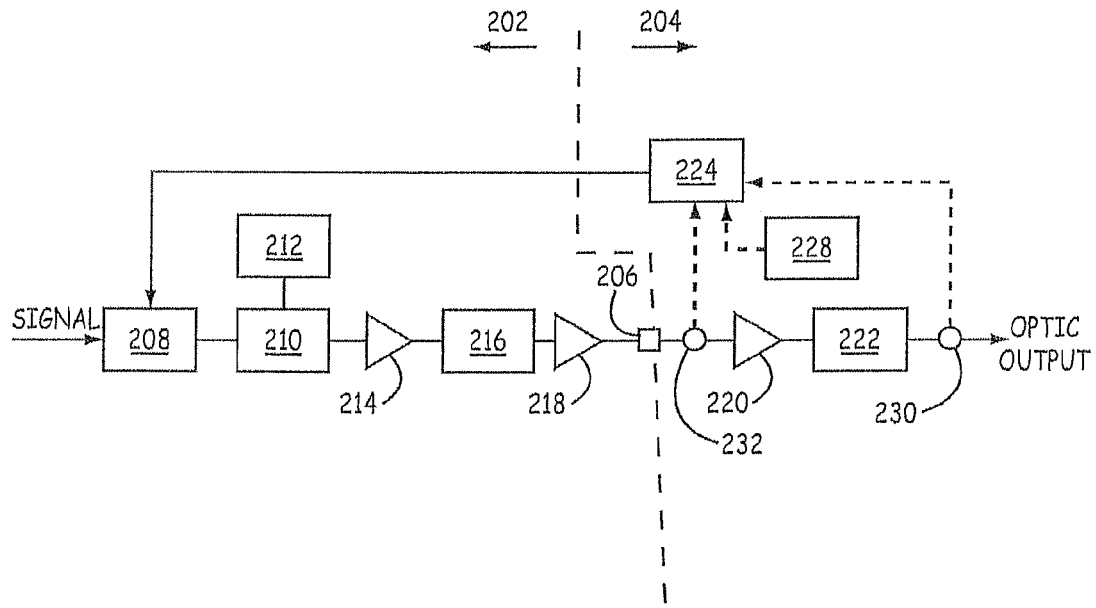
FIG. 3A is a schematic diagram of a system for generating and providing pre-distortion information in and to a hybrid optical fiber coaxial cable (HFC) system.

FIG. 3A shows edge QAM 202 and optical transmitter 204 connected by interface 206, e.g., a 25 ohm RF interface. While the division between edge-QAM 202 and optical transmitter 204 can be considered arbitrary, the division provides a convenient design framework since the edge-QAM 202 provides electrical RF signals based on user specific content and optical transmitter 204 provides laser module specific performance. The interface involves transfer of appropriate signals to provide the respective functionalities including, for example, pre-compensation for optical transmitter and fiber nonlinearities for efficient production of optical signals with low distortion. As described below, the division of the optical transmitter provides for the formation of separate modules, which can be plug-in components. A digital switch or other device passes a signal to edge QAM 202 to provide user specific digital content.

Edge QAM 202 comprises processing unit 208 that comprises an integrated circuit or processor, such as a field programmable gate array (FPGA) or an application-specific integrated circuit (ASIC), and provides a signal to high speed digital-to-analog converter (DAC) 210, which further communicates with frequency reference 212. The processing unit 208, DAC 210, and frequency reference are equivalent to a DDS unit, such as DDS 114 shown in FIG. 1. In some embodiments, the DDS can comprise a single component or more than two components to provide the indicated functions. In the embodiment shown in the figure, an RF signal from DAC 210 passes through amplifier 214, variable RF attenuator 216, which can be used to adjust the RF power level to a desired value, and RF amplifier 218 to interface 206 and into the optical transmitter 206. While suitable RF transmission components are shown in FIG. 3A, additional embodiments with different and/or additional RF transmission components can be used to provide a desired RF signal intensity to optical transmitter 204. Similarly, some components of the RF transmission between processing unit 208 and laser driver/laser assembly 222 can be shifted between edge QAM 202 and optical transmitter unit 204. In particular, a variable RF attenuator can be placed in the edge QAM, and a signal from the optical transmitter unit can be used to control the RF attenuator in the edge QAM. The RF signal passes though RF amplifier to laser module 222 that passes optical signals to an optical network or the like, generally through an optical fiber connector (not shown). Electrical component 224 provides pre-distortion parameters to directly or indirectly to processing 208, e.g., at the integrated circuit therein. The pre-distortion parameters account for distortion contributed by laser module 222 and/or total optical fiber link (not shown).

In some embodiments, electrical component 224 can comprise a suitable memory that comprises information relating to the pre-distortion parameters for optical transmitter 204. This information can be programmed into memory, for example, prior to shipping a complete optical transmitter unit. The information can be, for example, a unit number that provides for obtaining pre-distortion parameters from a look up table or a digital representation of the RF signal to provide the appropriate pre-distortion for the laser nonlinearities or other infoiination that allows an RF modulator to obtain or calculate the appropriate digital pre-distortion signal. Additional electrical circuitry to calculate a pre-distortion signal from the information in electrical component 224, if used, can be located in the optical transmitter 204 or the RF modulator 202 or split between the optical transmitter 204 and the edge QAM 202.

In additional or alternative embodiments, electrical component 224 may comprise a microprocessor and further receive signal information that is used in creation of the pre-distortion parameters for dynamic correction of nonlinearities. As shown in FIG. 3A, electrical component 224 can receive optionally signals from sensor 228 and/or from an optical coupler or tap 230 and RF coupler or tap 232. Sensor 228 can measure, for example, laser temperature, laser bias voltage and/or other local conditions that can influence optical transmitter nonlinearities. Optical coupler 230 and RF coupler may be integrated into the system at a position downstream and upstream, respectively, of laser driver/laser assembly 222. One or both of the couplers/tap may be used to provide signal information, as indicated by dashed lines connecting the couplers and microprocessor. If both couplers 230, 232 are used, the microprocessor may compare the upstream and downstream signal information to isolate distortion created by laser driver/laser assembly 222 and RF amplifier 220, and use the comparison data to create data related to the pre-distortion correction that is provided to processing unit 208. The correction may include predetermined parameters specific to laser modulator 222 or be based only on the comparison data.

Electrical component 224 may be an integrated circuit or other microprocessor programmed for active processing and/or supply of data or a passive device, e.g., random access memory, non-volatile memory, or other memory. Information in electrical component 224 may comprise parameters for the specific laser module in the device. For example, the laser may be tested at the point of manufacturing or at other times to measure the distortion that it creates. The distortion has consistent components that are specific to the laser; these components may be analyzed and appropriate compensatory corrections created that are placed in, or otherwise introduced by, the electrical component. The pre-distortion correction provided to the DDS may comprise initial values for pre-distortion based on the laser's intrinsic nonlinearity at normal operating conditions as well as other nonlinearities which may exist in the system. The pre-distortion corrections may thus compensate for the net nonlinearity of the optical transmitter which includes, the laser modulator, other optical components, and other RF components including RF amplifiers. Examples of corrections are compensations for one or more of second, third, and higher nth order distortions in the optical transmitter.

In one form the pre-distortion parameters are complex functions, i.e., having real and imaginary components which can be represented with an amplitude and a phase, over the range of operating frequencies, f:

$PD2_{magnitude}(f)$
$PD2_{phase}(f)$
$PD3_{magnitude}(f)$
$PD3_{phase}(f)$, where these functions are defined over a range from $f_{min}$ to $f_{max}$, and application of PDn to the RF signal will compensate for $n^{th}$ order distortion. Each of these functions can be approximated by polynomial or step-wise linear functions.

Figure 3B:
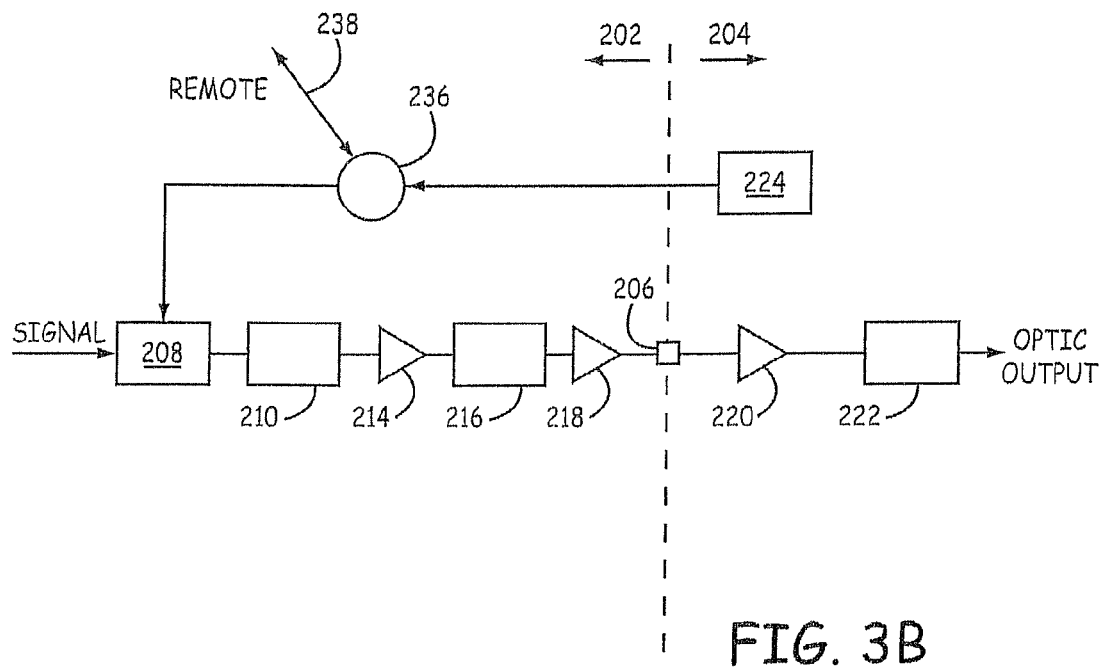
FIG. 3B is an alternative embodiment of a system for generating and providing pre-distortion information in and to a HFC system.

These pre-distortion compensations can be implemented in the DDS in either the frequency or time domains depending on how the edge QAM processes the synthesis. Fourier transform methods may be used to convert these functions from acting on the RF signal in the frequency domain into functions acting on the signal in the time domain. Information passed to the DDS allows the DDS to add appropriate amount of pre-distortion to allow the optical output of the transmitter to meet predetermined specified quality requirements. The pre-distortion information can be an approximation, e.g., a step-by-step linear or nonlinear approximation, of the function in either the frequency or time domains. FIG. 3B depicts an alternative pre-distortion correction embodiment for edge-QAM 202 and optical transmission unit 204 that is similar to the embodiment of FIG. 3A, without optional couplers 230, 232, although additional embodiments can comprise an intermediate processor as described in the embodiment of FIG. 3B along with an optical coupler/tap such as 230 and an RF coupler/tap such as 232. Edge QAM 202 or other embodiments may further comprise processor 236 that provides further processing and/or connectivity for processing pre-distortion corrections. Electrical component 224 may provide data that requires further manipulation that is to be carried out by processor 236. Additionally or alternatively, processor 236 may have internet or other connectivity 238 to retrieve data. For instance, processor 236 may receive serial number information for optical transmitter 222 and initiate a protocol to obtain correction parameters from a database provided by the manufacturer of optical transmitter 204. Or processor 236 may provide a look-up table for retrieving information based on data passed to it. Alternatively, electrical component 224 may have some or all of these features.

Figure 4:
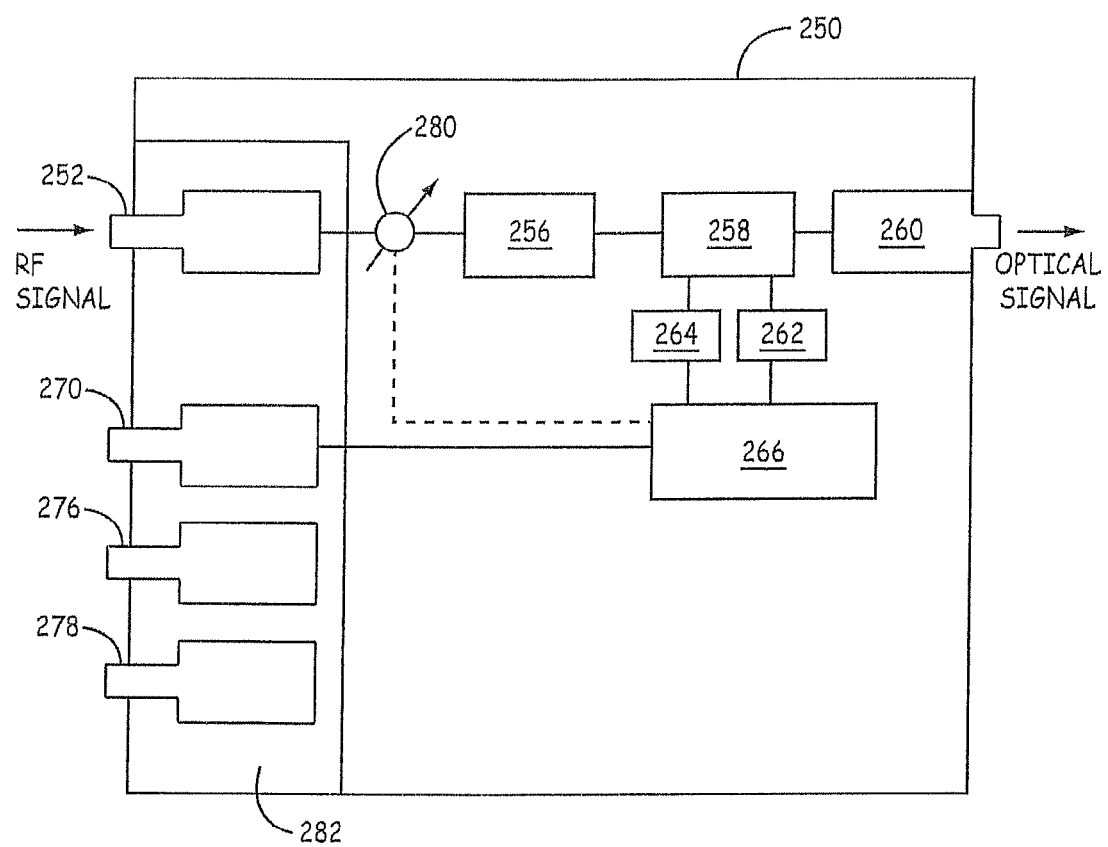
FIG. 4 is a schematic diagram of an optical transmitter module for providing pre-distortion information to an HFC system.

FIG. 4 shows an embodiment of an optical transmitter module comprising a driver circuit for a laser or other optical transmitter. Optical transmitter module 250 comprises RF connector 252 that provides an RF interface for receiving an RF signal input that is passed to laser module 258, which passes the signal to optical fiber connector 260 that provides an interface with an optical fiber communication network. Laser module 258 can be further interfaced with temperature controller/sensor 262 and/or bias controller/sensor 264, which are operably connected with electric component 266, such as a microprocessor. Microprocessor 266, as described herein, provides pre-distortion information to communications interface 270 which can comprise appropriate pin connectors. Temperature controller/sensor 262 can provide temperature measurements such that nonlinearities of laser module 258 and other optical component (not shown) can be adjusted based on known estimates of the temperature dependence of the nonlinearities and/or can control a heating, such as a resistance heater and/or a cooling element, such as a thermo-electric cooler, to help to maintain the temperature of the laser at or near target temperature values. Similarly, bias controller/sensor 264 can measure the bias voltage delivered to the laser module to provide for adjustment of pre-distortion parameters based on the specific biased voltage and/or can adjust the bias voltage to attempt to keep the bias voltage close to a particular selected value. Optical transmitter module 250 can further comprise a plurality of additional electrical connectors such as 276, 278 to provide power, ground, telemetry functions and/or additional functions and exchange of information as desired. Optical transmitter module 250 can optionally comprise a transformer 256 to match impedance with laser modulator 258. Improved impedance matching provides for improved power transfer and reduced reflection of the signal. Microcontroller 266 may further be connected to optional variable RE attenuator 280 to adjust the amplitude of the RF signal. Alternately, microcontroller 266 may communicate through communications interface 270 to request that the edge QAM raise or lower the power of the RF signal at RF interface/connector 252. RF interface/connector 252, communications interface 270, connector 272, and connector 274 may collectively be part of a pluggable module 268 that interfaces with a host chassis, as described further below.

In use, optical transmitter module 250 can be provided in a single housing or on a single card and placed into an HFC system with fiber optic connector 260 connected to an optical fiber or other optical transmission conduit, which can be connected to a MUX or other processing equipment for directing signals directly or indirectly to an end user device. RF connector 252 is connected to receive an RF signal input. Electrical connectors/pins 276, 278 are connected to receive one or more of power, ground, and telemetry, while electrical connector 270 is connected directly or indirectly to a DDS and passes the pre-distortion information to the DDS. Potential pin assignments are described further below. Electrical component 266 within optical transmitter module 250 may automatically control the bias current to optical transmitter 258 at a factory-set bias current. Also, electrical component 266 may have access to a calibrated thermistor in proximity to the laser, and can control the current to a thermo-electric cooling device to maintain the laser at a constant operating temperature over all operating conditions of the laser module.

When the module is in a plugged-in position in a host chassis, a pre-arranged communications protocol provides communication of the pre-distortion functions to the appropriate RF modulator. The RF modulator generally is designed with appropriate communication channels for interfacing with the optical transmitter module. The RF modulator pre-distorts the RF signal for the optical transmitter module by adjusting for the pre-distortion information in its process of direct digital signal synthesis.

An optical transmitter may be set to a constant bias current and temperature at the point of manufacture. At that time, or separately, the settings may include a measurement of the second and third (or more) order distortion with a standard optical modulation index (OMI). The standard OMI corresponds to a constant RE input power to the module. The microprocessor or other memory source in, or accessible by, the module may store the operating current, $T_{op}$, the operating bias current, $I_{bias-op}$, a laser chirp parameter(s) that enables compensation for distortion generated in a length, L, of standard (ITU-T G.652) single mode fiber, and the frequency-dependent amplitude and phase of the second-, third- and/or higher ordered distortion of the whole module. These frequency-dependent amplitudes and phases can be approximated, for example, by a finite-order polynomial equation over the 50-1002 MHz operating range.

An alternative embodiment provides for monitoring but not controlling laser temperature. The laser bias current is controlled at a constant level, but that level can be adjusted under normal operating conditions. For instance, an isolated, un-cooled, O-band (1260-1310 nm) DFB laser may be used. Since the chromatic dispersion of standard, single-mode fiber (ITU-T G.652) is low in this region, the interaction of laser chirp and modulation will generate low IMD, and pre-distortion for the module (including laser) IMD contribution allows optical receivers to be placed at any fiber length from the optical transmitter module. The module's pre-distortion parameters as a function of laser temperature, bias current, and optionally other variables, can be stored in a look-up table in non-volatile or other memory.

In this embodiment, as the laser temperature changes, the module communicates information to the host chassis to enable suitable pre-distortion. In response to changes in the laser's operating temperature, it may be desirable to operate the laser at a different bias current. In this case the module would communicate to the host chassis information to provide suitable pre-distortion data to compensate for a potentially changed IMD contribution of the transmitter module.

Figure 5:
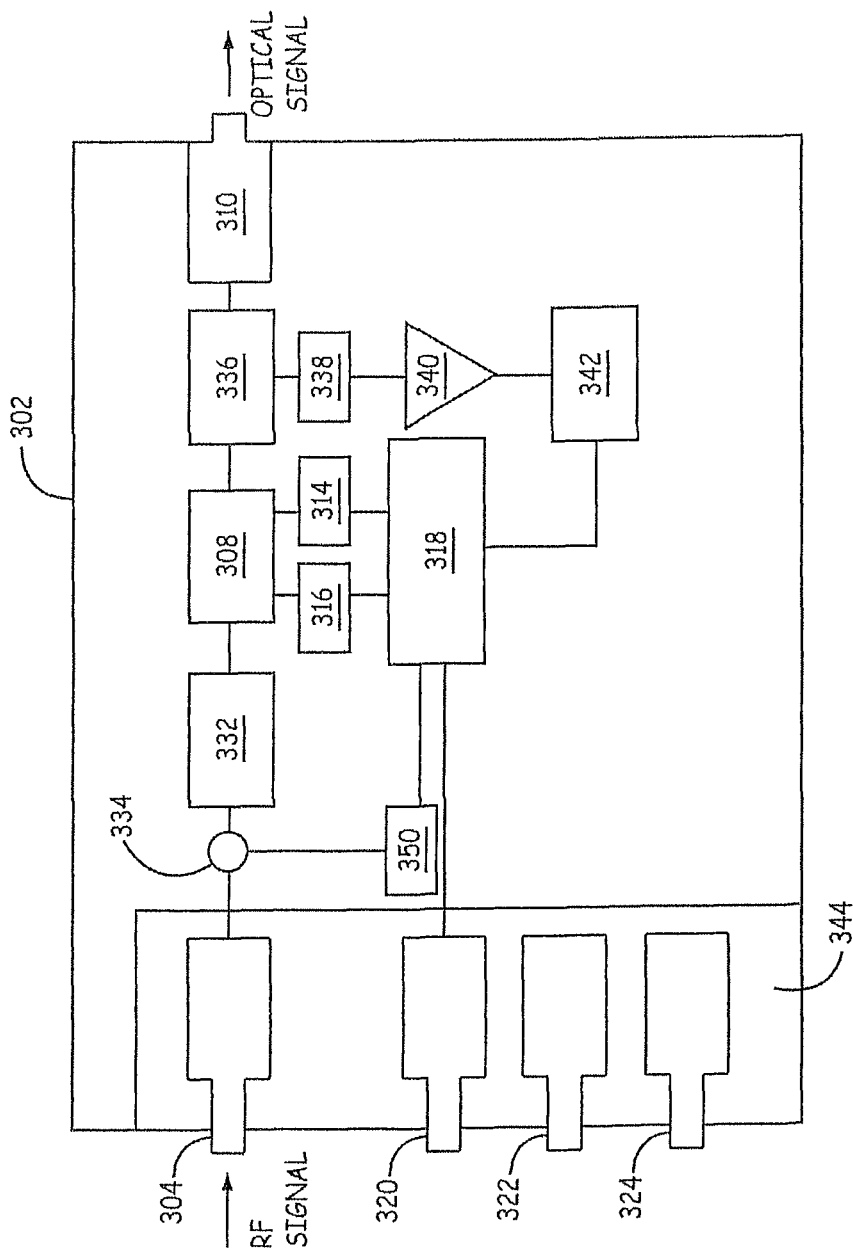
FIG. 5 is a schematic diagram of an alternative embodiment of an optical transmitter module for providing pre-distortion information to an HFC system.

FIG. 5 shows an embodiment of an optical transmitter module comprising a laser or other optical transmitter monitored for real time measurement of internal distortion and closed-loop control. This embodiment of the optical transmitter module shares some of the features of the embodiment of FIG. 4 and provides for a portion of the optical output to be directed to a photodiode which feeds a means for RF signal detection and distortion evaluation. Optical transmitter module 302 comprises RF connector 304 that receives an RF signal input that is passed to laser module 308, which passes the signal to optical interface 310, such as an optical fiber connector. The optical transmitter 308 is further controlled by temperature controller 314 and bias controller 316, which receive input from microprocessor 318. Microprocessor 318, as described herein, provides pre-distortion corrections through communications connectors 320. Optical transmitter module 302 can further comprise one or more additional connectors 322, 324 to provide power, ground, and telemetry functions. An option for this embodiment of optical transmitter module is inclusion of a transformer 332 to match impedance with laser module 308. Microcontroller 318 may further be connected to optional RF tap 334, and RF signal detector 350 to capture information on the RF signal upstream of the laser. Module 302 further comprises optical tap 336 that directs a portion of the signal to photodiode receiver 338. The photodiode generates an electrical signal directed to optional RF amplifier 340 that is connected to RF signal detector 342, which can be an A-to-D converter, and RF power detector with digital output or an RF tuner and 256-QAM demodulator, that is connected to microprocessor 318. In some instances the quality (and intermodulation distortion) of the RF signal at a given RF frequency can be inferred the amount of forward error correction (FEC) utilized in the 256-QAM demodulator. This signal quality is directly related to the, the RF carrier-to-noise+internodulation distortion: C/(N+I). This FEC information, as a function of RF frequency can (or may) be forwarded to microcontroller 318 by RF signal detector 342. RF connector 304, communications connectors 320, 322, and 324 may collectively be part of a pluggable electrical connector 344 that interfaces with a mated connector associated with the host chassis.

In use, optical transmitter module 302 can be provided in a single housing or on a single card and placed into an HFC system with optical connector 310 connected to a fiber optic or other optical transmission channel, which can be connected to a MUX or other processing equipment for directing signals directly or indirectly to an end user device. RF connector 304 is connected to receive an RF signal input. Electrical connectors 320, 322, 324 are connected to exchange pre-distortion information along with one or more of power, ground, and telemetry. Specifically, pre-distortion information is transmitted directly or indirectly to the DDS. RF signal detector 342 provides a measure of signal distortion, and microprocessor 318 may receive a measurement from detector 342 and provide at least a portion of the pre-distortion information in essentially real time.

Figure 6:
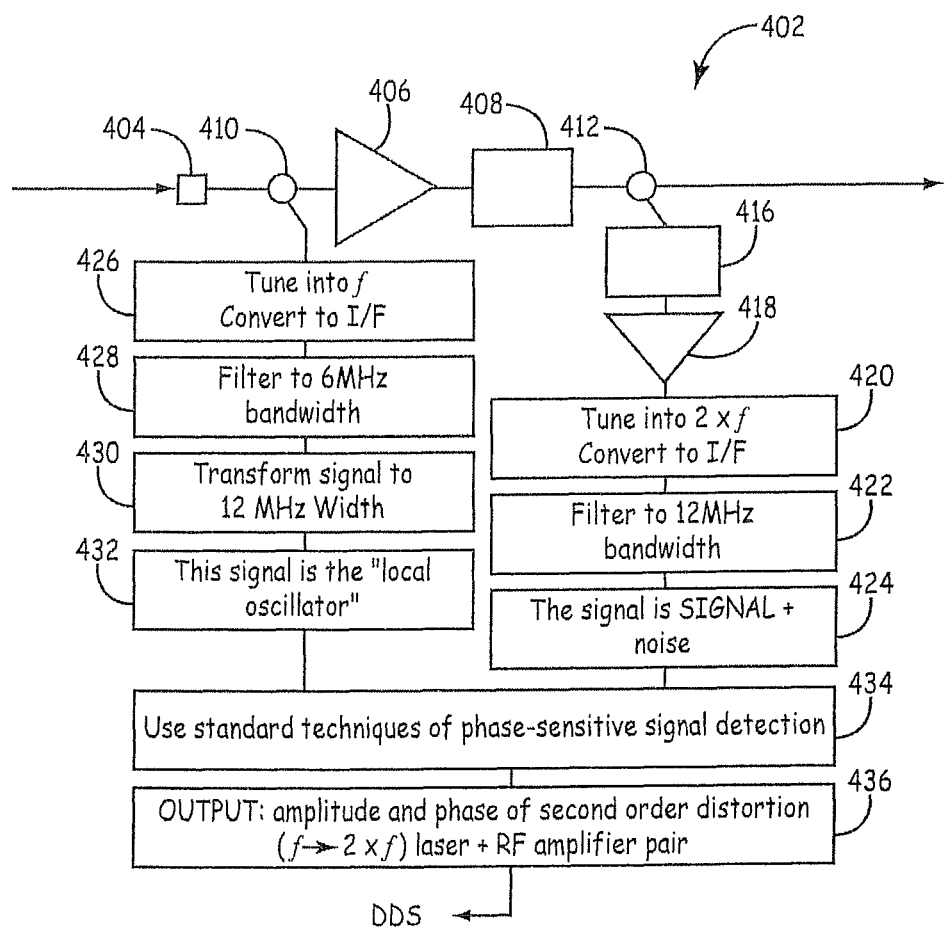
FIG. 6 is a schematic diagram of components for an optical transmitter module for providing pre-distortion information to an HFC system.

FIG. 6 illustrates another embodiment of components of an optical transmitter unit for implementing measurement of internal distortion and closed-loop control system for effectively real-time pre-distortion. System 402 receives a broadband RF signal having a frequency range between $f_{min}$ and $f_{max}$ at connector 404 and amplifies the signal with broadband RF amplifier 406 for passage to optical transmitter 408, which passes the signal to the optical communications network. The signal is monitored upstream of optical transmitter 408 with RF coupler 410 and downstream of optical transmitter 408 with optical coupler 412. The RF transmission upstream of the optical transmitter is monitored at RF coupler 410 and passed to a microprocessor or other device or devices that tunes to f (where $f_{min}<f<f_{max}$) and converts the signal to IF, intermediate frequency, as at 420, filters to 6 MHz bandwidth at 428, transforms the signal to 12 MHz width second harmonic as at 430, and provides local oscillator signal 432. Optical coupler 412 passes a portion of the optical signal to photodiode receiver 416 and RF amplifier 418, which passes the signal to a microprocessor or other device or devices that tunes to the second order harmonics at frequency 2f that is inverted to IF, as depicted at 420. A filter is applied to 12 MHz bandwidth, as at 422 to provide the Signal+Noise transmission 424.

The Signal+Noise signal 424 and local oscillator signal 432 undergo standard techniques of phase-sensitive signal detection at 434, with an output 436 providing amplitude and phase of second order distortion (f→2×f) laser+RF amplifier pair. Output 436 provides the basis for a pre-distortion correction that is passed to the DDS. The steps may all be accomplished using analog electronics. However, digital electronics components may also be used. For example the step "tune to f, convert to IF", can be accomplished in a single integrated circuit. This same technique can be used to determine the frequency-dependent amplitude and phase of the third order distortion. In addition this method can be adapted to measure the amplitude and phase of distortion products of sum or difference frequencies (i.e. not just harmonics.) Out-of-band (OOB) distortion products may also be measured. When measuring an in-band distortion product, the strong RF signal need not be considered noise, since that signal can be demodulated, and subtracted from overall sign.

The source of the signal at frequency f, can be the actual data traffic. Alternately, it can be a single-frequency pilot tone generated by the edge-QAM, or a spread spectrum RF signal centered at frequency f generated by the edge-QAM to enable distortion monitoring.

Figure 7:
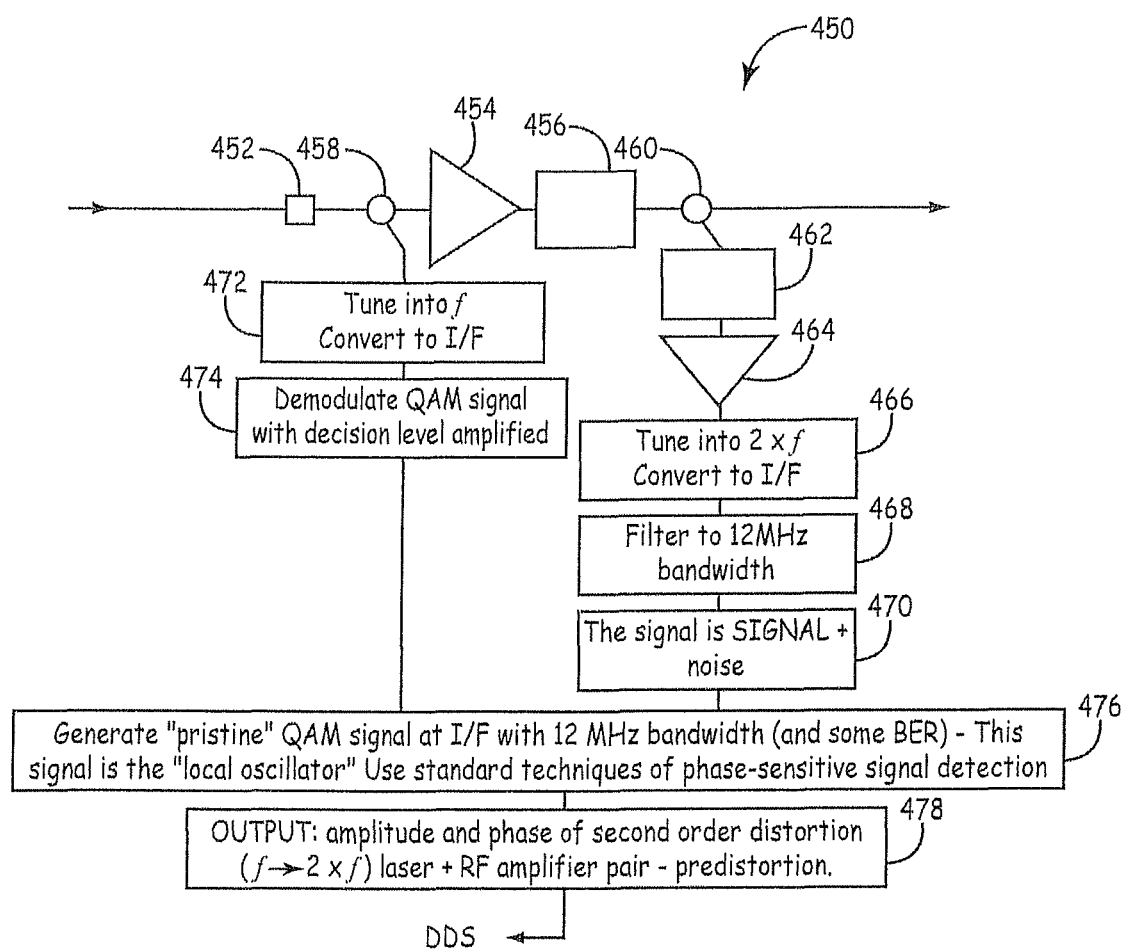
FIG. 7 is a schematic diagram of an alternative system of components for an optical transmitter module for providing pre-distortion information to an HFC system.

FIG. 7 illustrates further embodiments of components for implementing measurement of internal distortion and a closed-loop control system. In this embodiment, the detected signal at the RF coupler (which includes the pre-distortion applied at the edge QAM) is not used as a reference. The detected signal at the RF coupler gives a perfect ("pristine") QAM constellation, but includes some bit errors (bit error ratio, BER). The amplitude and phase of this distortion product is detected with standard—phase sensitive (i.e. lock-in amplification) detection techniques. Referring to FIG. 7, system 450 receives an RF signal having a frequency off at connector 452 and amplifies the signal with amplifier 454 for passage to optical transmitter 456, which passes the signal to the optical transmission network. The signal is monitored upstream of optical transmitter 456 with RF coupler 458 and downstream of transmitter 408 with optical coupler 460. Coupler 460 passes a portion of the signal to photodiode 462 and amplifier 464, which passes the signal to a microprocessor or other device or devices that tunes to the second order harmonics at ±2f that is converted to IF, as depicted at 466. A filter is applied to 12 MHz bandwidth, as at 468 to provide the Signal+Noise signal 470. The signal upstream of the optical transmitter is monitored at RF coupler 458 and passed to a microprocessor or other device or devices that tunes to a frequency, f, corresponding to a transmitted 256-QAM channel, and converts the signal to IF as at 472 demodulates the QAM signal with a decision level to generate signal 474. Microprocessor or other devices 476 receive signals 470, 474 to generate "pristine" QAM signal at IF with 12 MHz bandwidth, as depicted at 476 to generate output 478 providing amplitude and phase of second order distortion of the optical transmitter, RF amplifier pair minus the pre-distortion. Output 478 provides the basis for a pre-distortion correction that is passed to the DDS. The steps may all be accomplished using analog and/or digital electronics. This same technique can be used to determine the frequency-dependent amplitude and phase of the third order distortion. In addition this method can be adapted to measure the amplitude and phase of distortion products of multiple frequencies (i.e. not just harmonics.) Out-of-band (OOB) distortion products may also be measured.

FIG. 8 shows an exemplary pluggable package for an optical transmission module with the functionality for providing pre-distortion information, with FIG. 8A depicting a top view, FIG. 8B depicting a front view with optical connector 482 on face 484, and FIG. 8C depicting a rear view with an electrical connector 486 on face 488. Pluggable module 480 comprises an optical transmitter, generally a directly—or externally-modulated laser and electrical component for providing the pre-distortion information. Optical connector 482 on face 484 transmits optical output to the corresponding optical network, and electrical connector 486 provides the connection to the edge-QAM. Electrical connector 486 comprises an RF connector 490 and a plurality of pins or tabs 492 to interface with power, telemetry, and ground or other electrical interfaces. A shield 494 or the like can be used to provide protection for the electrical connections. Generally, the shield interfaces with a mated structure on the RF modulator such that the connections align with the corresponding connections on the edge QAM and to further reduce the chance of damaging the electrical connections. In use, the module may be plugged into an optical transmitter receptacle located on a host chassis of the edge QAM that includes a DDS engine.

It is generally desirable for the module to have a relatively small format. Based on the desire also to occupy a small volume in the host chassis while accommodating the particular components, the module can have a relatively long length (L) and a small cross sectional area with the optical and electrical connectors at respective opposite front and rear surfaces, respectively. In some embodiments, the length can be from about 50 mm to about 150 mm and in further embodiments from about 60 mm to about 125 mm. The width (W) can be from about 10 mm to about 25 mm and in further embodiments from about 14 mm to about 22 mm, to allow for placement of the electrical connectors. The height can be from about 5 mm to about 12 mm and in further embodiments from about 6 mm to about 10 mm. In some embodiments, the module can have approximate dimensions of 80 mm×18 mm×8.5 mm. A person of ordinary skill in the art will recognize that additional ranges within the explicit ranges above are contemplated and are within the present disclosure.

A module may use a standard pin configuration, such as a thirty pin interface, for passing data traffic, for supplying electrical powering to the transceiver, for communication between the host chassis and the transceiver, and for electrical grounding. For example one or more, or all of, the following pins may be utilized: (1) GND: One or multiple un-used pins can be assigned to electrical ground; (2) Multiple pins may be assigned for electrical powering, including VCC5 for +5 VDC powering and/or VCC3 for +3.3 VDC powering; (3) Multiple pins may be assigned to communicate transmitter status, or enable state change of the transmitter by host chassis, such as TX_DIS, which (using TTL logic) is pulled low by the module, but when set high by the host chassis, disables the laser; (4) At least two pins can be devoted to a 2-wire serial communications interface: SCL is a 2-wire serial interface clock and SDA is a 2-wire serial data interface line; (and 5) Other pins may be defined for other functions.

The module may further comprise a mechanical shield or other device to prevent the module from being plugged into a standard XFP receptacle. The host chassis receptacle may further include a mechanical device which prohibits a XFP MSA standard-conforming module from being plugged into the host receptacle. An electrical interface between the pluggable module and the host chassis may include an RF interface for passing the RF signal from the host chassis and to the pluggable module, a communications interface by which the module can communicate information which enables the DSS engine to accomplish an RF pre-distortion for the pluggable optical transmitter module. The module primary function is one-way, forward-path transmission, and may or may not include optical receiver functionality. Optical receiver functionality can be provided by separate components not described in detail herein. The module may have, for example, a single SC/APC optical receptacle on the front, although other optical connectors can be used as desired. Compared to a standard XFP MSA transceiver, the signal input to the module may be, for instance, analog, broadband RF in the CATV forward path band (50-1002 MHz) (as opposed to digital on-off keying at 10 Gb/s).

The electrical interface may include a blind-mating coaxial connector for the RF input signal, in addition to the electrical pin connectors for power, telemetry and other functions. The physical dimensions and location, and RF impedance may be matched with an opposite-sex connector in the module receptacle in the chassis containing the RF modulator. The impedance of this coaxial connector may be, for example, 25Ω. An embodiment of the module is an enclosure with dimensions of approximately 79.10 mm×18.35 mm×8.50 mm. The module may be designed to slide into a receptacle on a chassis of a box which includes an RF modulator or modulators (edge-QAM), and connect, through a blind-mating process, the RF modulator output with the RF signal input to the transmitter module. The module may include a distributed feed-back (DFB) laser optical sub-assembly (OSA), which includes an optically-isolated DFB laser operating in the C-band (1535-1365 nm) and means for controlling the temperature of the DFB laser, for instance a thermo-electric or Peltier cooler or a heating element used in conjunction with an electronic temperature probe (thermistor). The module may further include a means for controlling the bias current of the DFB laser at a constant value, a means for modulating the current of the DFB laser with the RF input signal to the module, a means for coupling the OSA to an SC/APC fiber connector, and a means for controlling the amount of composite RF power that drives the laser diode. This feature can be accomplished, for example, by including a variable RF attenuator in the signal path, or by sending instruction to the host chassis to appropriately adjust the RF output power. The module may include a laser driver circuit to directly modulate the DFB laser, with the RF signal from the RF modulator.

The embodiments above are intended to be illustrative and not limiting. Additional embodiments are within the inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A pluggable optical transmitter module for providing an optical interface comprising:
   a modulated laser optically coupled to an optical conduit directed to an optical fiber communications link and electrically coupled to an electrical RF source line that provides an RF source to drive the modulated laser;
   an electrical storage/processing component comprising a digital processor, memory with stored predistortion parameters specific for the pluggable optical transmitter module and a data output configured to transmit pre-compensation data;
   a communication channel connected to the data output of the electrical storage/processing component to carry the pre-compensation data specific for the pluggable optical transmitter module and/or the optical fiber communications link;
   a housing containing the modulated laser and electrical storage/processing component;
   an electrical plug connection providing an interface through the housing, the electrical plug connection comprising an RF signal input connection and a plurality of pin connectors wherein an RF signal input is in electrical connection with the directly-modulated laser or an external modulator for the externally-modulated laser through the electrical RF source line, and at least some of the pin connectors are in electrical connection with the communication channel wherein nonlinear responses of the pluggable optical transmitter module and/or the optical fiber communications link are communicated from the pluggable optical transmitter module such that they are available to pre-compensate the RF signal input based at least in part on predetermined pre-distortion parameters specific for the pluggable optical transmitter module and/or the optical fiber communications link based on the data transmitted over the communications channel; and
   an optical connector providing an interface through the housing and designed for interfacing with an optical fiber or an optical fiber connector.

2. The pluggable optical transmitter module of claim 1 wherein the modulated laser comprises a directly-modulated distributed feedback laser.

3. The pluggable optical transmitter module of claim 1 wherein the modulated laser is an externally modulated laser that is modulated by a Mach-Zender modulator.

4. The pluggable optical transmitter module of claim 3 wherein the modulator is based on lithium niobate.

5. The pluggable optical transmitter module of claim 1 wherein the modulated laser is an externally modulated laser that is modulated by an electro-absorption modulator.

6. The pluggable optical transmitter module of claim 5 wherein the modulator is based on InP.

7. The pluggable optical transmitter module of claim 1 wherein the modulated laser is an externally-modulated laser, which is modulate by a modulator that is InP-based.

8. The pluggable optical transmitter module of claim 1 further comprising a temperature sensor wherein the temperature sensor provides temperature information to the digital processor.

9. The pluggable optical transmitter module of claim 1 further comprising a laser bias control operably connected to the digital processor wherein the laser bias control provides information on the laser bias voltage to the modulated laser.

10. The pluggable optical transmitter module of claim 1 further comprising an optical tap optically coupled to the optical conduit, an RF tap configured to receive RF signal from the electrical RF source line, and an optical receiver optically connected to the optical tap.

11. The pluggable optical transmitter module of claim 1 further comprising an RF amplifier.

12. The pluggable optical transmitter module of claim 1 wherein the predetermined predistortion parameters are transmitted in a format for reception by a direct digital synthesis engine.

13. The pluggable optical transmitter module of claim 1 further comprising a temperature controller.

14. The pluggable optical transmitter module of claim 1 further comprising a voltage bias controller electrically connected to the modulated laser and to the digital processor for adjustment of the predistortion parameters.

15. The pluggable optical transmitter module of claim 1 further comprising a transformer connecting the RF input and the modulated laser to provide improved impedance matching of an optical laser modulator.

16. The pluggable optical transmitter module of claim 1 further comprising an RF attenuator receiving RF signal from the corresponding connector pin.

17. The pluggable optical transmitter module of claim 1 further comprising an RF tap, RF signal detector configured to direct a portion of the RF signal to the digital processor.

18. The pluggable optical transmitter module of claim 1 further comprising a light tap and a receiver, wherein the light tap is configured to direct a portion of laser output to a receiver and the receiver is configured to direct a corresponding signal to the digital processor.

19. The pluggable optical transmitter module of claim 1 having a length from about 50 mm to about 150 mm, a width from about 10 mm to about 25 mm and a height from about 5 mm to about 12 mm.

* * * * *